United States Patent
Honda et al.

(10) Patent No.: US 6,975,086 B1
(45) Date of Patent: Dec. 13, 2005

(54) POSITIONING CONTROL METHOD

(75) Inventors: Hideki Honda, Fukuoka (JP); Ryuichi Oguro, Fukuoka (JP); Shuang-Hui Hao, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/914,849

(22) PCT Filed: Mar. 2, 2000

(86) PCT No.: PCT/JP00/01246

§ 371 (c)(1),
(2), (4) Date: Sep. 4, 2001

(87) PCT Pub. No.: WO00/52543

PCT Pub. Date: Sep. 8, 2000

(30) Foreign Application Priority Data

Mar. 3, 1999 (JP) ............................... 11/055759
Nov. 15, 1999 (JP) ............................... 11/324184

(51) Int. Cl.⁷ ............................................. G05B 11/01
(52) U.S. Cl. ..................... 318/560; 318/135; 318/611; 318/649
(58) Field of Search .................. 318/135, 560, 318/565–567, 574, 611, 623, 649, 671, 675–676, 318/687

(56) References Cited

U.S. PATENT DOCUMENTS

| | | | | |
|---|---|---|---|---|
| 4,843,293 A | * | 6/1989 | Futami | ........................ 318/609 |
| 5,079,493 A | * | 1/1992 | Futami et al. | ............... 318/640 |
| 5,726,542 A | * | 3/1998 | Ebihara | ......................... 318/35 |
| 5,726,879 A | * | 3/1998 | Sato | .............................. 700/56 |
| 5,952,804 A | * | 9/1999 | Hamamura et al. | .......... 318/560 |
| 6,281,643 B1 | * | 8/2001 | Ebihara | ......................... 318/35 |
| 6,564,110 B1 | * | 5/2003 | Makino et al. | ................ 700/56 |
| 6,665,053 B2 | * | 12/2003 | Korenaga | ..................... 355/72 |

FOREIGN PATENT DOCUMENTS

| | | | | |
|---|---|---|---|---|
| JP | 61-32120 | 2/1986 | ............. | G05D 3/12 |
| JP | 2-82303 | 3/1990 | ............. | G05D 3/12 |
| JP | 4-271290 | 9/1992 | ............. | H02P 5/00 |
| JP | 4-333110 | 11/1992 | ........... | G05D 19/02 |
| JP | 9-244710 | 9/1997 | ........... | G05B 13/04 |
| JP | 2000-92881 | 3/2000 | ............. | H02P 5/00 |

* cited by examiner

Primary Examiner—Marlon Fletcher
(74) Attorney, Agent, or Firm—Sughrue Mion, PLLC (57) ABSTRACT

A pre-compensator is provided based on a definition of abase vibration model having a motor transfer function 1 for generating motor displacement 12 from an input that is the sum of input torque and a table propelling force 10 multiplied with a reducer and Cartesian-to-polar coordinate transformation constant 14, a table transfer function 14 for multiplying a deviation 11 between an output that is the motor displacement multiplied with a reducer and polar-to-Cartesian coordinate transformation constant 2 and table displacement with a table-displacement-to-force conversion spring constant 3 to generate the table propelling force 10 and to output table displacement 7, and a base driving transfer function 5 for generating base displacement by multiplying base displacement 9 with a base-displacement-to-force conversion spring coefficient 6 and inputting the same with the table propelling force, table displacement 8 being generated from a difference between the table displacement and the base displacement.

8 Claims, 10 Drawing Sheets

PRIOR ART

POSITIONING CONTROL METHOD

TECHNICAL FIELD

The present invention relates to a method for positioning a table positioning apparatus used for electronic circuit broad assembly steps and machine tools such as a machining center.

BACKGROUND ART

Figure 6:
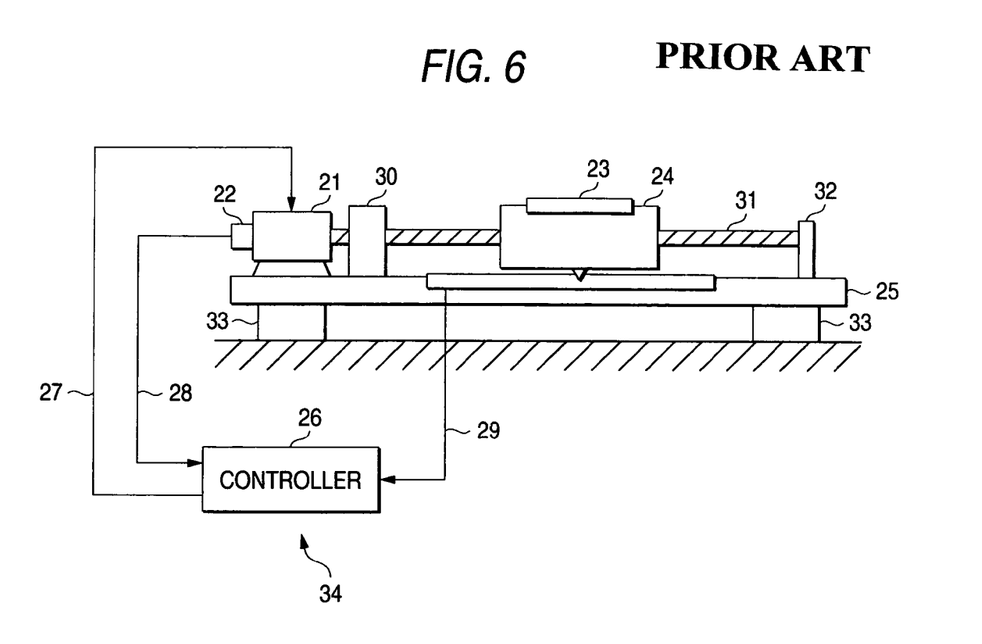
FIG. 6 is a diagram showing an example of a conventional configuration for table positioning control.

An example of a conventional positioning control method will be described with reference to FIG. 6. FIG. 6 shows an example of a configuration for positioning control in the direction of only one axis. In FIG. 6, 21 represents a motor; 22 represents a motor position detector; 23 represents a workpiece; 24 represents a table; 25 represents a base (surface plate); 26 represents a motor controller; 27 represents a motor driving signal; 28 represents a motor position detection signal; 29 represents a table position detection signal; 30 represents a reduction gear; 31 represents a ball screw; 32 represents a nut supporting an end of the ball screw; 33 represents an anti-vibration pad; and 34 represents a position target value signal.

In FIG. 6, the position target value signal 34 is supplied to the motor controller 26, and the motor controller 26 controls the position of the table 24 having the workpiece 23 placed thereon such that it will reach the position target value using the motor position detection signal 28 and table position detection signal 29.

Figure 7:
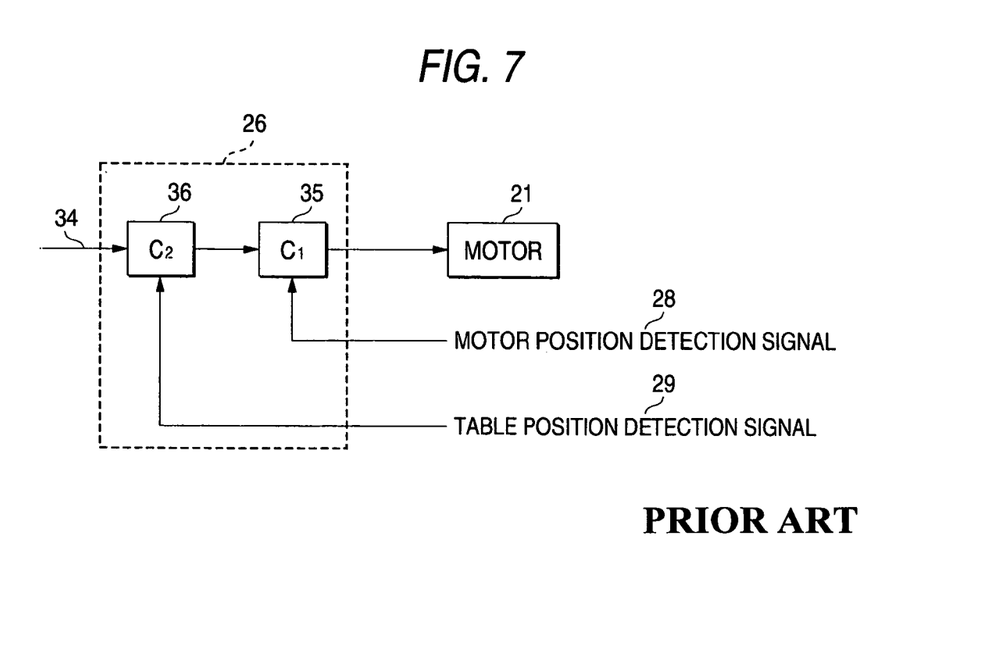
FIG. 7 is a block diagram of a motor controller shown in FIG. 6.

FIG. 7 shows a block diagram of an example of a configuration for control in the motor controller 26. In FIG. 7, 36 represents a table position compensator, and 35 represents a motor control compensator. The table position compensator 36 evaluates the table position detection signal 29 and the table position target value to determine a value to be output to the motor position compensator 35. The motor position compensator 35 evaluates the output of the motor position detection signal 28 and the output of the table position compensator 36 and outputs a drive signal to the motor 21. Many conventional motor controllers perform table positioning by positioning a motor using only the motor position detection signal 28. While the above-described example has referred to a ball screw as an example of a table driving mechanism, an increasing number of apparatuses utilize a linear motor as driving means recently. In general, a motor controller uses also the table position detection signal in such cases. As thus described, the position of a table has been made equal to a target value to put a workpiece secured to the table in a desired target position.

However, a recent trend toward reduction of table moving time in order to improve production yield has resulted in higher table moving speeds and greater propelling forces for driving a table. As a result, a greater reaction force is applied to the base from the table when the propelling force occurs, which has resulted in vibration of the base. This phenomenon is significant especially when a linear motor is used as means for driving the table. Since the displacement and phase of vibration is different between the table and the base during base vibration, the base vibration remains even after a table driving operation to cause fluctuation of the table position, which has resulted in a problem in that the time between the beginning and end of table driving can not be reduced.

There is another problem in that methods for suppressing base vibration through improvement of existing facility have small feasibility because the size and cost of the facility will be increased when base vibration is to be measured.

DISCLOSURE OF THE INVENTION

It is an object of the present invention to provide a positioning control method which makes it possible to improve positioning performance and product yield by suppressing base vibration without any need for improving facility.

In order to achieve the above-described object, according to a first aspect of the invention, there is provided a positioning control method wherein driving means for driving a table holding a workpiece and movable in a predetermined direction and measuring means for measuring the displacement of said driving means and the position of the table are provided on a base and wherein the workpiece held on the table is positioned to a target position using a displacement signal measured by said measuring means, the method being characterized in that a compensator is provided based on a definition of a base vibration model having:

a motor transfer function for generating motor displacement from an input that is the sum of input torque and a table propelling force multiplied with a reducer and Cartesian-to-polar coordinate transformation constant;

a table transfer function for multiplying a deviation between an output that is said motor displacement multiplied with a reducer and polar-to-Cartesian coordinate transformation constant and table displacement with a table-displacement-to-force conversion spring constant to generate said table propelling force and to output table displacement from said table propelling force; and a base driving transfer function for generating base displacement by multiplying the base displacement with a base-displacement-to-force conversion spring coefficient and inputting the same with said table propelling force, table displacement being generated from a difference between said table displacement and said base displacement.

According to a second aspect of the invention, there is provided a positioning control method according to the first aspect, characterized in that when a motor controller is configured to control the table position by positioning the motor based on only a motor position detection signal, a pre-compensator is provided by adding a motor controller model to which a position target value is input upstream of the motor transfer function of said compensator and in that said pre-compensator outputs a position command, time sequential data of the motor model position, time sequential data of a torque model command, and a compensation value for suppressing base vibration to said motor controller.

According to a third aspect of the invention, there is provided a positioning control method according to the second aspect, characterized in that when said motor controller is configured to control the table position based on a motor position detection signal and a table position detection signal, a pre-compensator is provided by adding a position compensator model upstream of the motor controller model of said pre-compensator and in that said pre-compensator outputs a position command, time sequential data of the motor model position, time sequential data of the torque model command, time sequential data of a motor position command model, and a compensation value for suppressing base vibration to said motor controller.

According to a fourth aspect of the invention, there is provided a positioning control method according to the first aspect, characterized in that when said motor controller is configured to control the table position by positioning the motor based on only a motor position detection signal, characterized in that a state estimator is constituted by said compensator and in that a compensator for providing feedback of an estimated displacement value of the base is added.

According to a fifth aspect of the invention, there is provided a positioning control method according to the fourth aspect, characterized in that when said motor controller is configured to control the table position based on the motor position detection signal and the table position detection signal, a state estimator is constituted by said compensator to provide feedback of an estimated displacement value of the base.

According to a sixth aspect of the invention, there is provided a positioning control method according to the first aspect, characterized in that when the motor controller is configured to control the table position by positioning the motor based on only the motor position detection signal, a pre-compensator is provided by adding a controller model to which a position target value is input upstream of the motor transfer function of said compensator and in that said pre-compensator outputs a position command, time sequential data of the motor model position, and time sequential data of a torque model command to the motor controller.

According to a seventh aspect of the invention, there is provided a positioning control method according to the sixth aspect, characterized in that when the motor controller is configured to control the table position based on a motor position detection signal and a table position detection signal, said pre-compensator is provided by adding a controller model to which a target position value is input upstream of the motor transfer function of said compensator and in that said pre-compensator outputs a position command, time sequential data of the motor model position, time sequential data of the torque model command, time sequential data of a motor model position, and time sequential data of a torque model command to said motor controller.

According to an eighth aspect of the invention, there is provided a positioning control method according to the first aspect, characterized in that parameters such as a table mass of the base vibration model and various transformation constants are identified using genetic algorithm.

In the above-described configurations, a pre-compensator having a base vibration model is provided upstream of a position command input of a motor controller, and base vibration is suppressed by outputting a position command and a compensation value for suppressing base vibration from the compensator to the motor controller, which makes it possible to improve position control performance. In this case, it is possible to adopt either of the configuration in which a motor position detection signal is used as the measuring means signal and the configuration in which both of motor position detection signal and table position detection signal are used.

Alternatively, base vibration can be suppressed to improve positioning performance by providing a state estimator utilizing a base vibration model for a motor controller and by adding a compensator for providing feedback of an estimated displacement value of the base. In this case, it is possible to adopt either of the configuration in which a motor position detection signal is used as the measuring means signal and the configuration in which both of motor position detection signal and table position detection signal are used.

Parameters of a base vibration model can be automatically and accurately tuned by identifying actual control objects including various parameters using parameter identification utilizing genetic algorithm, which makes it possible to suppress base vibration and to thereby improve positioning performance.

As thus described, according to the invention, since a model is defined in consideration to base vibration, control configuration for compensating or suppressing base vibration can be provided by designing a pre-compensator and a feedback compensator using such a model, which is advantageous in that the time from the beginning of table driving until the end of the same can be reduced and in that positioning performance and project yield is improved.

Further, according to the invention, there is no need for adding new facility such as a base position measuring device. This is advantageous in that the invention can be implemented in facility in operation by only changing software, which us advantageous in that the invention provides high feasibility of cost reduction.

BEST MODE FOR CARRYING OUT THE INVENTION

A first mode for carrying out the invention will now be described with reference to the drawings.

Figure 1:
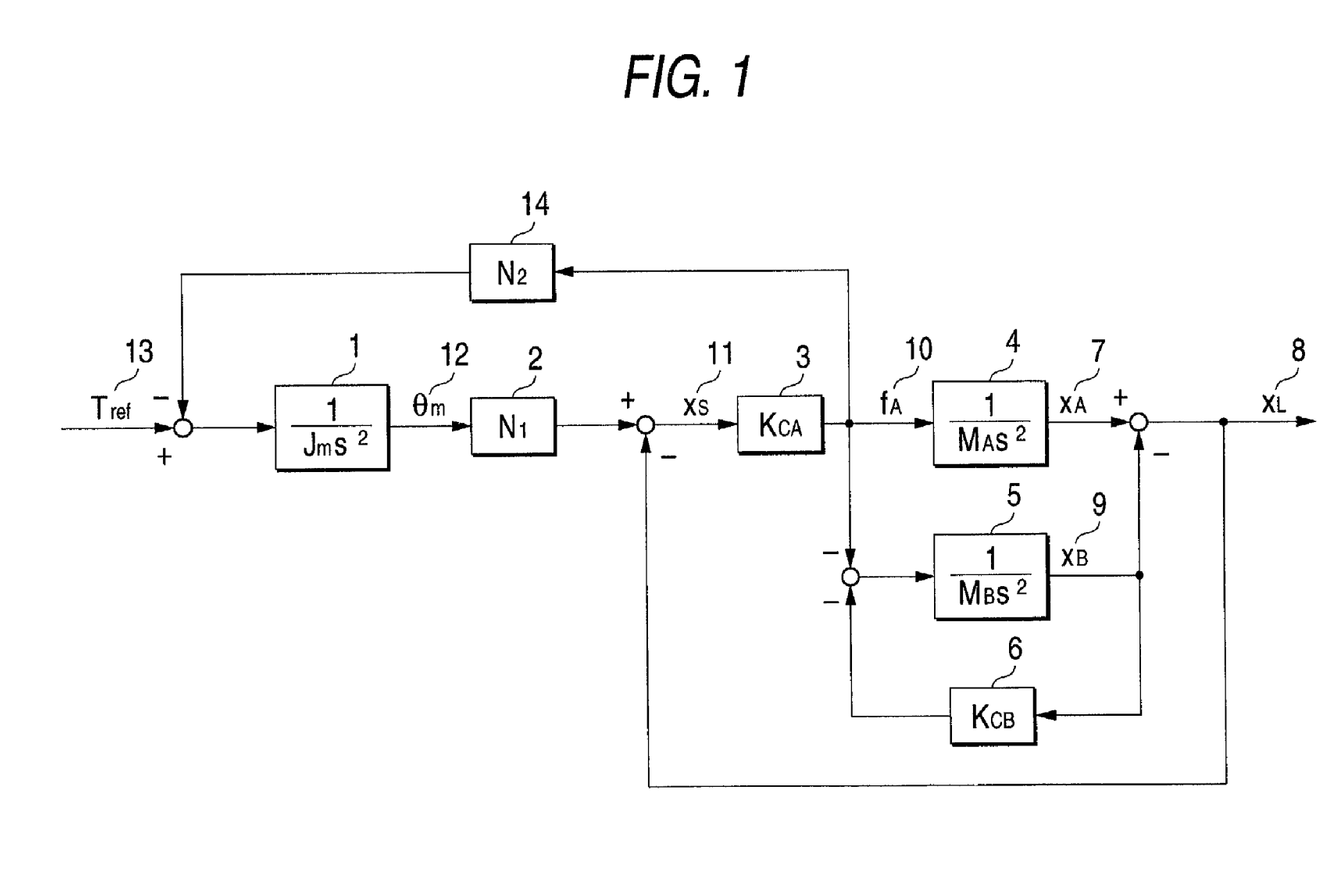
FIG. 1 is a block diagram of a base vibration model according to a first mode for carrying out the invention.

FIG. 1 is a block diagram of a base vibration model according to the first mode for carrying out the invention.

In FIG. 1, 1 represents a motor transfer function; 2 represents a reducer and polar-to-Cartesian coordinate transformation constant; 3 represents a table-displacement-to-force conversion spring constant; 4 represents a table driving transfer function; 5 represents a base driving transfer function; 6 represents a base-displacement-to-force conversion spring constant; 7 represents absolute displacement of a table from the ground; 8 represents displacement of the table from a base; 9 represents displacement of the base from the ground; 10 represents a propelling force for driving the table; 11 represents a difference in displacement between the table and motor output; 12 represents motor displacement; 13 represents torque (propelling force) for driving the motor; and 14 represents a reducer and Cartesian-to-polar coordinate transformation constant.

First, the sum of the input torque 13 and the table propelling force 10 multiplied with the reducer and Cartesian-to-polar coordinate transformation constant 14 is input to the motor to generate the motor displacement 12. The deviation 11 between the motor displacement multiplied with the reducer and polar-to-Cartesian coordinate transformation constant 2 and the table displacement 8 is multiplied with the table-displacement-to-force conversion spring constant 3 to generate the table propelling force 10. The table is thus driven. The propelling force 10 is transmitted to the base 5 as a reaction force. The base 5 receives input of the table propelling force 10 and a force originating from a spring element provided between the ground and the same or a force that is the base displacement 9 multiplied with the base-displacement-to-force conversion spring constant 6, the base displacement 9 being thus generated. In this structure, the displacement of the table on the base or the table displacement 8 from the base is generated as a difference between the table displacement 7 and base displacement 9. A compensator for base vibration can be configured using such a structure.

Although an actual industrial machine such as a machine tool or semiconductor manufacturing apparatus is a multiple mass system rather than a triple mass system as described above, a phenomenon can be approximated using motor inertia, the mass of the base, and the mass of the table which are central values and a spring constant which can be determined from results of an experiment, which allows estimation of a required state signal. Advantages such as reductions in cost and processing time can be thus expected.

A method of control utilizing the same model will now be described.

Figure 2:
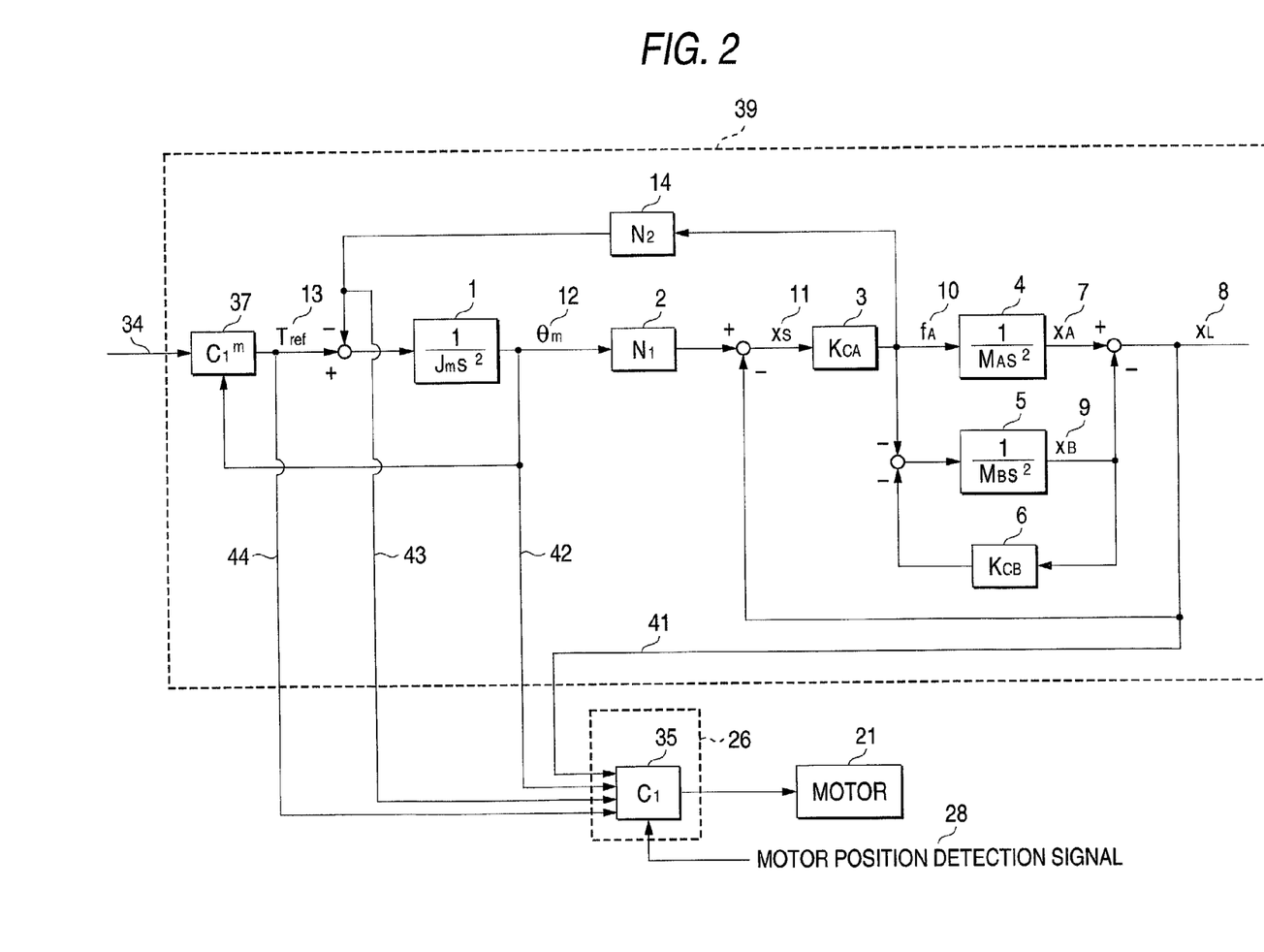
FIG. 2 is a configuration diagram of a positioning control system using the base vibration model shown in FIG. 1.

FIG. 2 is a configuration diagram of a positioning control system using the base vibration model shown in FIG. 1.

FIG. 2 is associated with the second aspect of the invention and is a configuration diagram of a control system in which the positioning control method is implemented. 37 represents a model of a motor controller in a pre-compensator; 39 represents a pre-compensator according to the inventive model; 41 represents a position command for the motor controller; 42 represents time sequential data of the position of the motor model; 43 represents a compensation value for suppressing base vibration; and 44 represents time sequential data of a torque model command. Other features which are identical to those in FIG. 1 are indicated by like reference numbers and will not be described to avoid repetition.

The principle of a specific base vibration compensating operation in such a configuration is that the table propelling force 10 that is the output of the table-displacement-to-force conversion spring constant 3 drives the table and that a negative reaction force acts on the base 5 to generate the base displacement is simulated and estimated from spring constants defined in the base vibration model and values measured on the table. A difference between the base displacement 9 and the table displacement 7 constitutes the table displacement 8 which is output as a position command. An operation of suppressing base vibration is performed by multiplying the table propelling force 10 originating from the loop formed by the table displacement 8, deviation 11, table driving transfer function, base driving transfer function, and table displacement with the reducer and Cartesian-to-polar coordinate transformation constant 14 to convert a rectilinear control value for the table into a rotation control value for the motor which is in turn input to a feedback controller 35 as the compensation value 42 for suppressing base vibration; inputting the table displacement 8 as the position command 41, the motor model time sequential data 41, and the torque model time sequential data 44; and compensating the position command based on the time sequential data to control the motor 21.

As thus described, behaviors of base vibration can be simulated in advance in the pre-compensator 39 according to model definitions such as the spring constant to allow estimation of each state quantity, which makes it possible to input a compensation value to the conventional feedback controller 35 in advance to control the motor, thereby suppressing base vibration. This allows a significant improvement in positioning accuracy.

A second mode for carrying out the invention will be describe based on the drawings.

Figure 3:
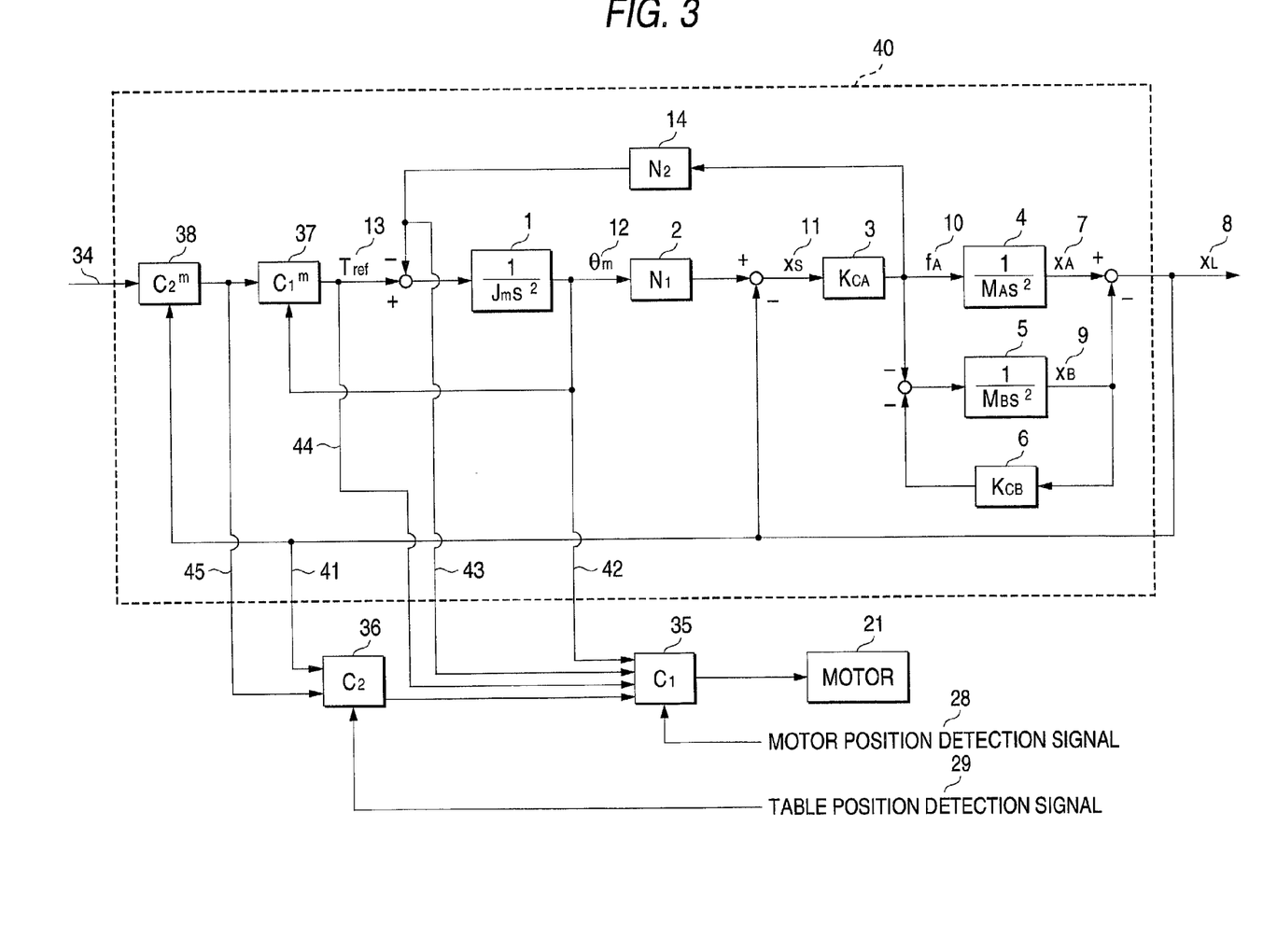
FIG. 3 is a configuration diagram of a positioning control system using a base vibration model according to a second mode for carrying out the invention.

FIG. 3 is a configuration diagram of a positioning control system using a base vibration model according to a second mode for carrying out the invention.

FIG. 3 is associated with the third aspect of the invention and is a configuration diagram of a control system in which the positioning control method is implemented. 38 represents a model of a table compensator in a pre-compensator; 40 represents a pre-compensator according to the invention; and 45 represents time sequential data of a model of motor position command.

Other features which are identical to those in FIG. 2 are indicated by like reference numbers and will not be described to avoid repetition.

In the present mode for carrying out the invention, based on the fact that the conventional motor controller has a configuration including the table position controller 36, the table position compensator model 38 is also newly provided in the pre-compensator 40. As a result, behaviors of base vibration can be simulated in advance in the pre-compensator 40 to allow estimation of each state quantity, which makes it possible to input compensation values (42 through 44, 41, 45 and so on) to the conventional feedback controller 35 and 36 in advance. This improves positioning accuracy and follow-up performance.

A third mode for carrying our the invention will now be described based on the drawings.

Figure 4:
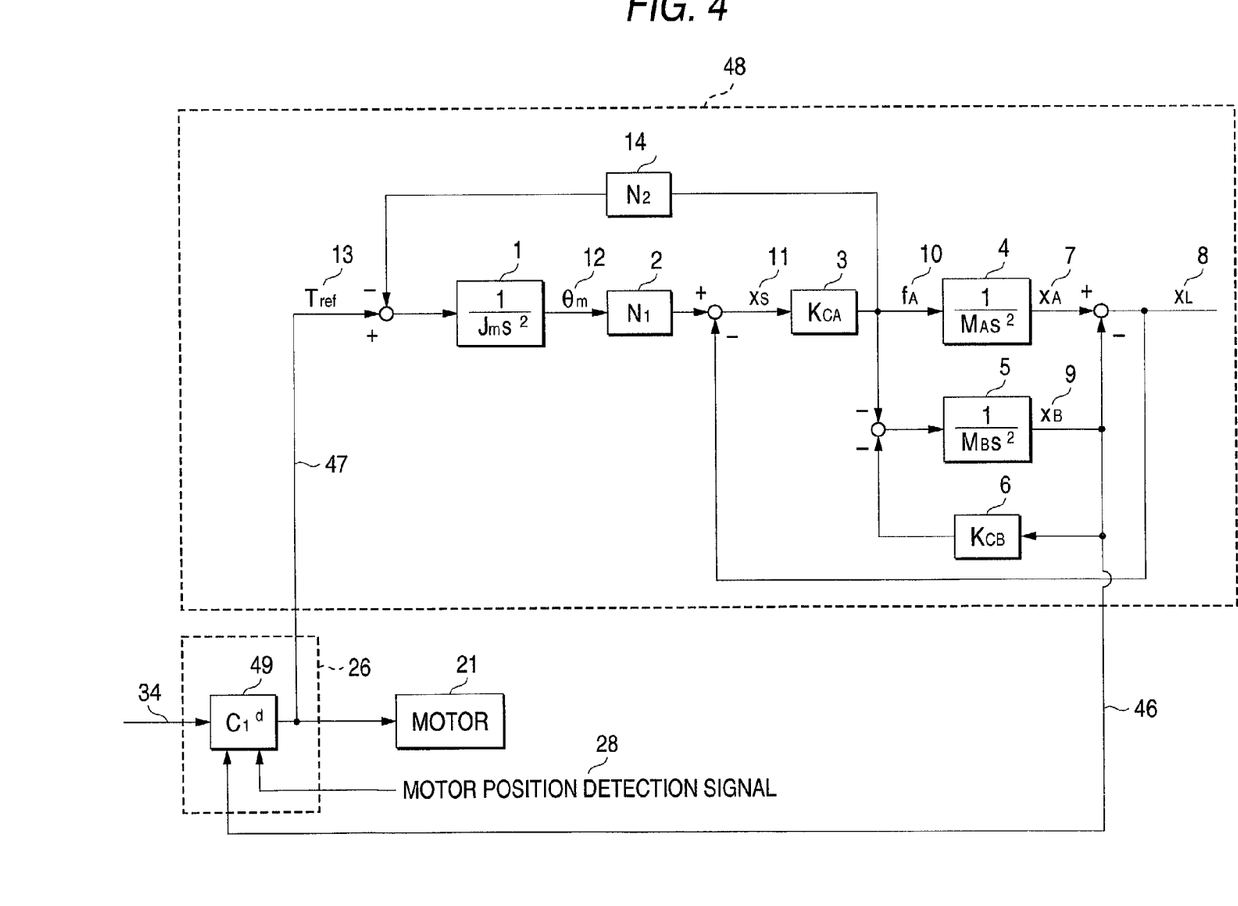
FIG. 4 is a configuration diagram of a positioning control system using a base vibration model according to a third mode for carrying out the invention.

FIG. 4 is a configuration diagram of a positioning control system using a base vibration model according to a third mode for carrying out the invention.

FIG. 4 is associated with the fourth aspect of the invention and is a configuration diagram of a control system in which the positioning control method is implemented. 46 represents an estimated base position value; 47 represents a torque command to the motor; 48 represents a state estimator for base vibration; and 49 represents a motor controller including a base feedback gain.

Other features which are identical to those in FIGS. 1 and 2 are indicated by like reference numbers and will not be described to avoid repetition.

A torque command supplied to the motor is input to the base vibration state estimator 48 to allow estimation of a state quantity of the base that can not be measured. The feedback of an estimated base position makes it possible to perform control for canceling any deviation based on a theory of a state feedback system, thereby suppressing base vibration.

A fourth mode for carrying out the invention will now be described based on the drawings.

Figure 5:
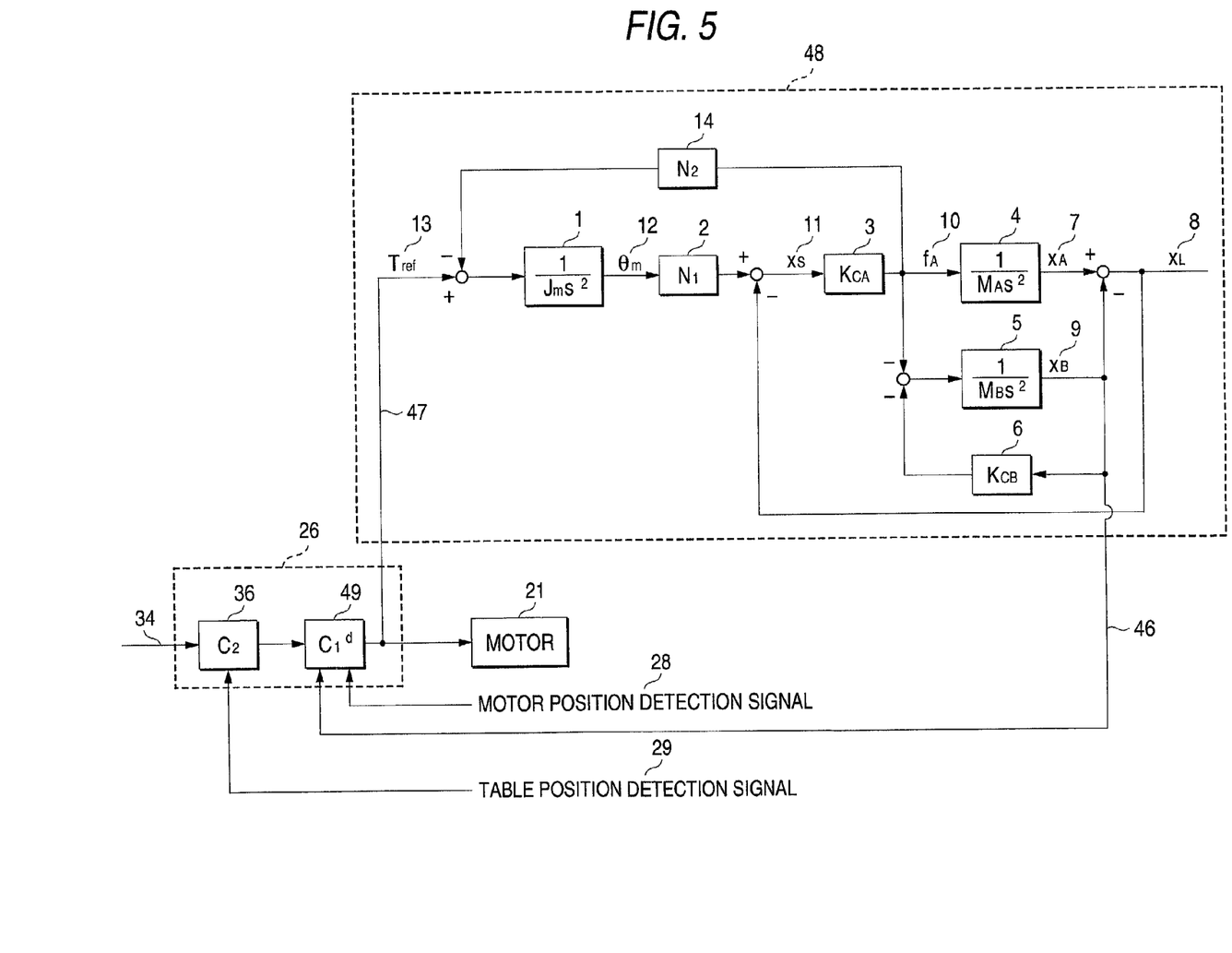
FIG. 5 is a configuration diagram of a positioning control system using a base vibration model according to a fourth mode for carrying out the invention.

FIG. 5 is a configuration diagram of a positioning control system using a base vibration model according to a fourth mode for carrying out the invention.

FIG. 5 is a configuration diagram of a control system associated with the fifth aspect of the invention, and reference numbers in FIG. 5 are the same as those in FIG. 4. The present mode for carrying out the invention is an example in which the table position compensator 36 is provided in the motor controller 26 to provide feedback of a table position detection value in addition to the feedback of an estimated base position in the previous mode for carrying out the invention shown in FIG. 4.

As thus described, the present invention makes it possible to perform positioning control efficiently at a reduced cost by using a method in which states of a base are estimated on a simulated basis with existing measuring devices for a table and motor and without any additional measuring device for the base.

A fifth mode for carrying out the invention will now be described based on the drawings.

Figure 8:
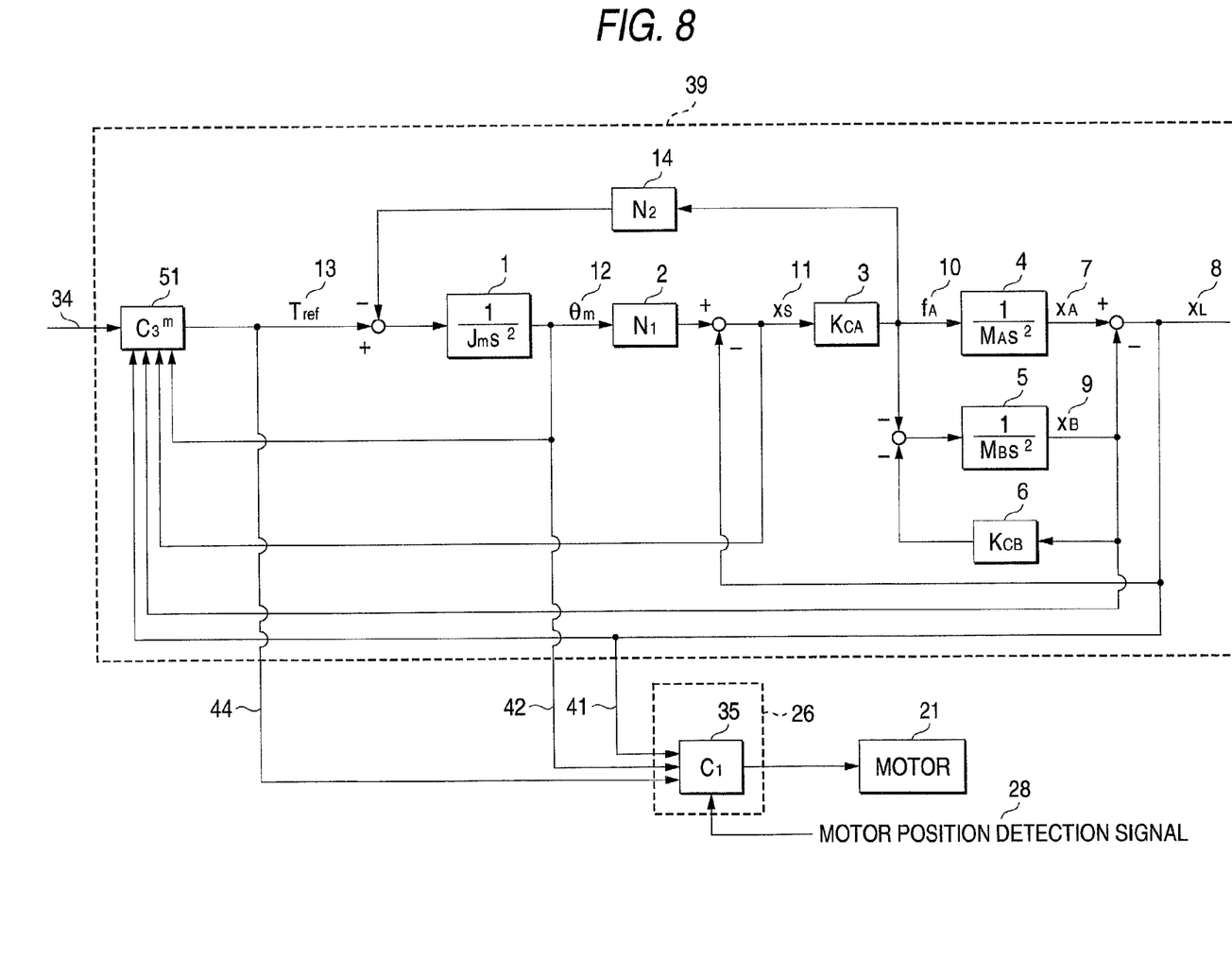
FIG. 8 is a configuration diagram of a positioning control system using a base vibration model according to a fifth mode for carrying out the invention.

FIG. 8 is a configuration diagram of a positioning control system using a base vibration model according to a fifth mode for carrying out the invention.

FIG. 8 is associated with the sixth aspect of the invention and is a configuration diagram of a control system in which the positioning control method is implemented and in which 51 represents a controller in a pre-compensator.

Other features which are identical to those in FIGS. 1 and 2 are indicated by like reference numbers and will not be described to avoid repetition.

In the present mode for carrying out the invention, feedback of states is achieved by a base vibration model to provide a controller in a pre-compensator. As a result, behaviors of base vibration can be simulated in the precompensator 39 in advance according to model definitions such as spring constants to estimate each state quantity. Each state quantity can be fed back to provide a gain for suppressing base vibration and to determine a control input for positioning the table in the base vibration model to a target position quickly. This makes it possible to input a compensation value for preferably controlling the base model to the conventional feedback controller 35, thereby controlling the motor to suppress base vibration. As a result, a significant improvement in positioning performance is achieved.

A sixth mode for carrying out the invention will now be described based on the drawings.

Figure 9:
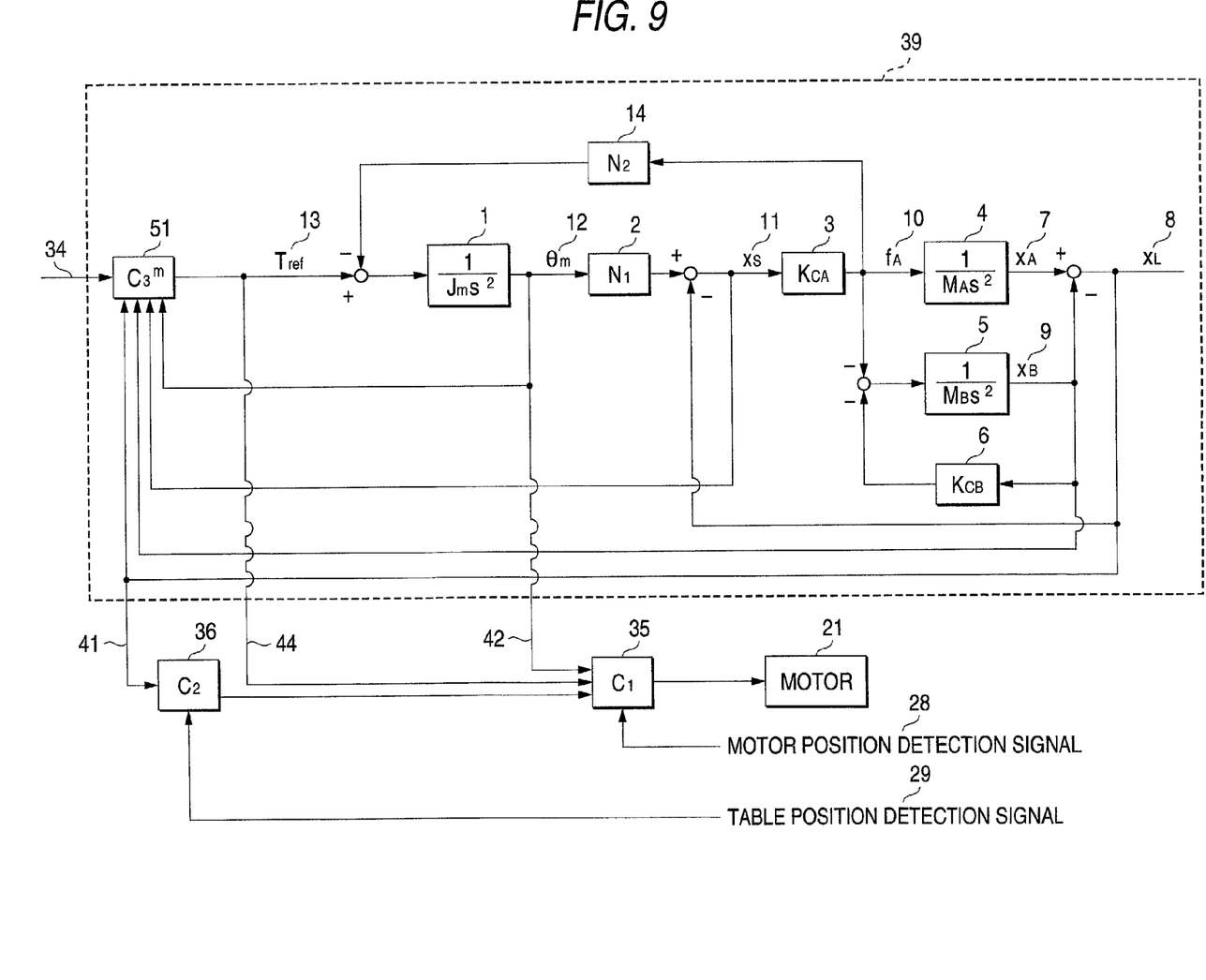
FIG. 9 is a configuration diagram of a positioning control system using a base vibration model according to a sixth mode for carrying out the invention.

FIG. 9 is a configuration diagram of a positioning control system using a base vibration model according to a sixth mode for carrying out the invention.

FIG. 9 is associated with the seventh aspect of the invention and is a configuration diagram of a control system in which the positioning control method is implemented. Other features which are identical to those in FIGS. 3 and 8 are indicated by like reference numbers and will not be described to avoid repetition.

The present mode for carrying out the invention has a configuration in which the table position compensator 36 is provided in the conventional motor controller 26. The controller in the pre-compensator is as the same as that in the sixth aspect of the invention, and positioning performance can be significantly improved by inputting a compensation value for the conventional controller in a manner in compliance with the configuration including the table position compensator.

A seventh mode for carrying out the invention will now be described based on the drawings.

Figure 10:
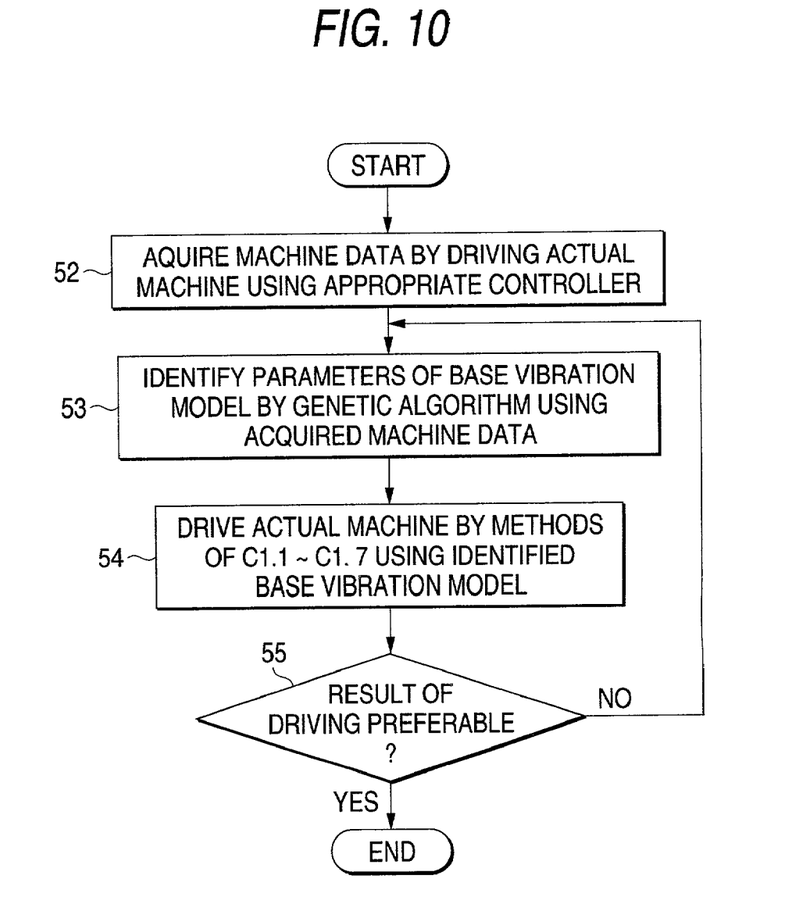
FIG. 10 is a processing flow chart of a positioning control system using a base vibration model according to a seventh mode for carrying out the invention.

FIG. 10 is a configuration diagram of a positioning control system using a base vibration model according to a seventh mode for carrying out the invention.

FIG. 10 is associated with the eigth aspect of the invention and is a flow chart of a process in which the positioning control method is implemented. 52 represents a first processing step for driving an actual machine as shown in FIG. 6 to acquire data; 53 represents a second processing step for identifying base vibration model parameters using genetic algorithm; 54 represents a third processing step for driving the actual machine according to rules for control utilizing a base vibration model having the parameters obtained at the above-described process; and 55 represents a fourth processing step for evaluating whether the result of the step 54 satisfies certain specifications.

First, the actual machine is driven according to conventionally used rules for control such as PID control to acquire torque commands and state quantities (position, speed, and so on) that can be measured on the actual machine during the driving (first processing step). At this time, it is sufficient to measure only the motor angle if the table position can not be measured.

Next, the data acquired at the first processing step are used to identify the mass of the table, the mass of the base, the spring constants, and the transformation constants of the base vibration model according to the genetic algorithm proposed in Japanese patent application Hei-10-264336, for example.

Next, the actual machine is driven using the base vibration model having the parameters identified at the second processing step according to any of the control methods in the second through seventh aspects of the invention.

Next, an evaluation is conducted to check whether the result of control obtained at the third processing step satisfies certain specifications. If not, the process is repeated from the second processing step. In doing so, the evaluation value of the genetic algorithm is changed at the second processing step.

By repeating the above-described process, a base vibration model set at optimum parameters is automatically decided, which makes it possible not only to reduce adjusting time but also to perform operations accurately.

Figure 11:
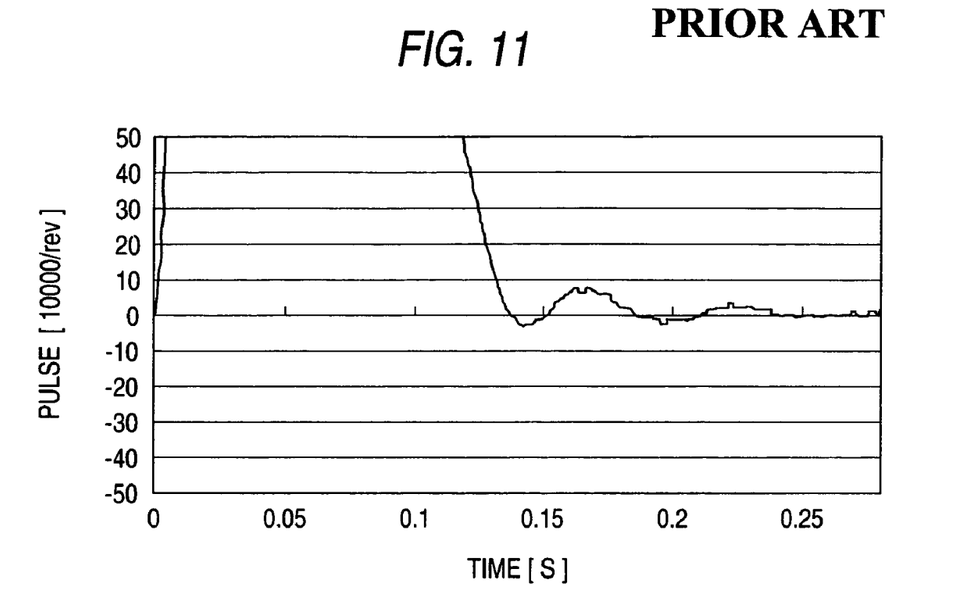
FIG. 11 shows results (positional deviations) of an experiment conducted using a conventional control method (positional deviation).
Figure 12:
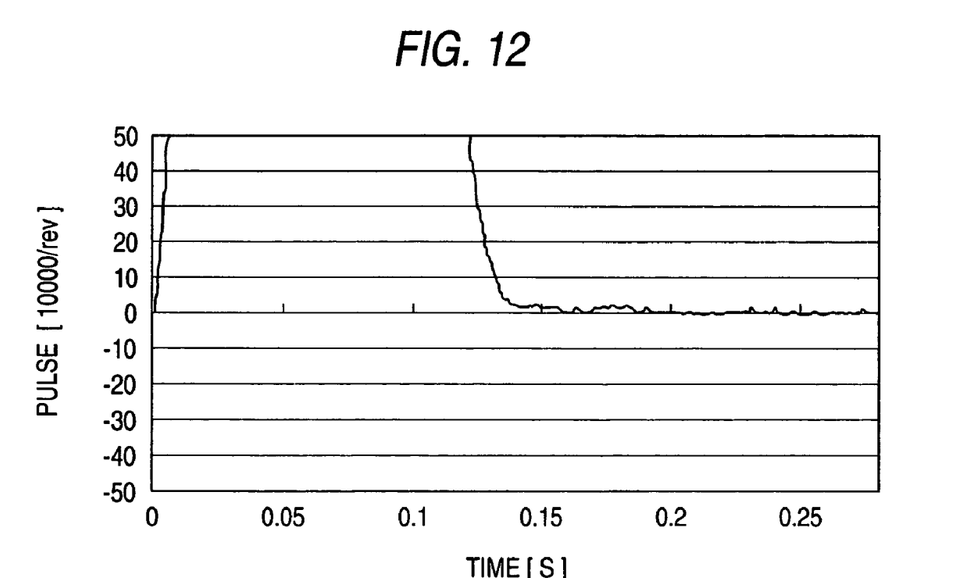
FIG. 12 shows results (positional deviations) of an experiment conducted using the present invention.

FIG. 11 shows results of an experiment conducted using a conventional technique, and FIG. 12 shows results of an experiment using the present invention. Either of the cases, positional deviations of an actually measured position from a command are shown, and the target position of the command is reached at 0.08 [s]. After the command is issued at 0.08 [s], the deviation significantly fluctuates because of vibration of the base in FIG. 11, while it is apparent from FIG. 12 that significant suppression of vibration is achieved as a result of the application of the invention to improve control performance significantly.

INDUSTRIAL APPLICABILITY

As described above, the positioning control method of the invention is advantageous as a positioning method for table positioning apparatuses used for electronic circuit board assembly steps, semiconductor manufacturing apparatuses, and machine tools such as machining centers. Especially, while the use of a linear motor as table driving means results in a significant base vibration phenomenon, the present invention is serves to suppress base vibration preferably without any improvement of facility, to improve positioning performance, and to improve product yield.

What is claimed is:

1. A positioning control method wherein driving means for driving a table holding a workpiece and movable in a predetermined direction and measuring means for measuring the displacement of said driving means and the position of the table are provided on a base and wherein the workpiece held on the table is positioned to a target position using a displacement signal measured by said measuring means, the method being characterized in that a compensator is provided based on a definition of a base vibration model having:
    a motor transfer function for generating motor displacement from an input that is the sum of input torque and a table propelling force multiplied with a reducer and Cartesian-to-polar coordinate transformation constant;
    a table transfer function for multiplying a deviation between an output that is said motor displacement multiplied with a reducer and polar-to-Cartesian coordinate transformation constant and table displacement with a table-displacement-to-force conversion spring constant to generate said table propelling force and to output table displacement from said table propelling force; and
    a base driving transfer function for generating base displacement by multiplying the base displacement with a base-displacement-to-force conversion spring coefficient and inputting the same with said table propelling force, table displacement being generated from a difference between said table displacement and said base displacement.

2. A positioning control method according to claim 1, characterized in that when a motor controller is configured to control the table position by positioning the motor based on only a motor position detection signal, a pre-compensator is provided by adding a motor controller model to which a position target value is input upstream of the motor transfer function of said compensator and in that said pre-compensator outputs a position command, time sequential data of the motor model position, time sequential data of a torque model command, and a compensation value for suppressing base vibration to said motor controller.

3. A positioning control method according to claim 2, characterized in that when said motor controller is configured to control the table position based on a motor position detection signal and a table position detection signal, a pre-compensator is provided by adding a position compensator model upstream of the motor controller model of said pre-compensator and in that said pre-compensator outputs a position command, time sequential data of the motor model position, time sequential data of the torque model command, time sequential data of a motor position command model, and a compensation value for suppressing base vibration to said motor controller.

4. A positioning control method according to claim 1, characterized in that when said motor controller is configured to control the table position by positioning the motor based on only a motor position detection signal, characterized in that a state estimator is constituted by said compensator and in that a compensator for providing feedback of an estimated displacement value of the base is added.

5. A positioning control method according to claim 4, characterized in that when said motor controller is configured to control the table position based on the motor position detection signal and the table position detection signal, a state estimator is constituted by said compensator to provide feedback of an estimated displacement value of the base.

6. A positioning control method according to claim 1, characterized in that when the motor controller is configured to control the table position by positioning the motor based on only the motor position detection signal, a pre-compensator is provided by adding a controller model to which a position target value is input upstream of the motor transfer function of said compensator, said controller model determining a torque model command from signals obtained by multiplying base state quantities of the base vibration model with a gain and a position target value, the state quantities being represented by the relative position and speed of the base position and table position, the base position and the speed of the same, and a deviation between the table position and the motor position and the speed of the same in the base vibration model according to claim 1 and in that said compensator outputs time sequential data of the position model command, time sequential data of the motor model position, and time sequential data of the torque model command to a conventional controller.

7. A positioning control method according to claim 6, characterized in that when the motor controller is configured to control the table position based on a motor position detection signal and a table position detection signal, said pre-compensator is provided by adding a controller model to which a target position value is input upstream of the motor transfer function of said compensator and in that said controller model determining a torque model command from signals obtained by multiplying base state quantities of the base vibration model with a gain and a position target value, the state quantities being represented by the relative position and speed of the base position and table position, the base position and the speed of the same, and a deviation between the table position and the motor position and the speed of the same in the base vibration model according to claim 1 and in that said compensator outputs time sequential data of the position model command, time sequential data of the motor model position, and time sequential data of the torque model command to a conventional controller.

8. A positioning control method according to claim 1, characterized in that coefficients and transformation constants of each transfer function in the base vibration model are determined by:
    driving an actual machine to acquire a torque command and state quantities of the actual machine at a first processing step;
    determining parameters of the base vibration model using genetic algorithm at a second processing step;
    driving the actual machine according to rules for control utilizing the base vibration model thus determined at a third processing step; and
    evaluating results of the third processing step at a fourth processing step to automatically and accurately identify the parameters of the base vibration model by terminating the evaluation of specifications are satisfied and repeating the second and later processing steps if not satisfied.

* * * * *